Sept. 19, 1967     G. C. BARNETTE     3,341,951
DISPLAY CONTROL FOR TESTING AND TEACHING DEVICE
Filed Oct. 8, 1965     2 Sheets-Sheet 1
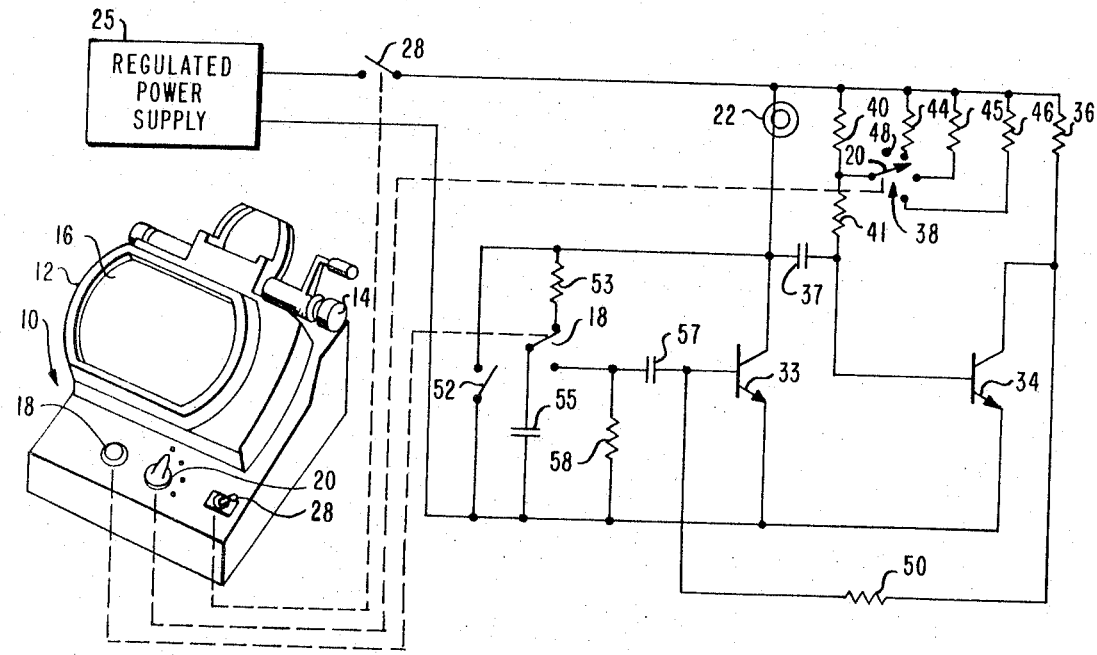
FIG.—1
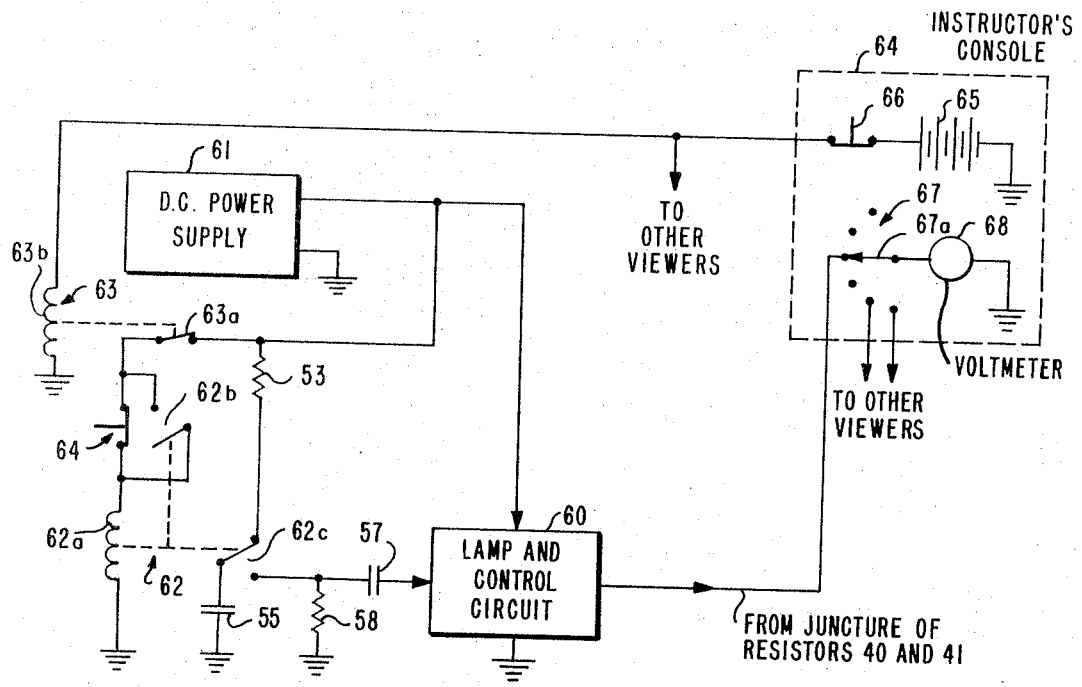
FIG.—2
INVENTOR.
GASPAR CISNEROS BARNETTE
BY Fraser and Bogucki
ATTORNEYS

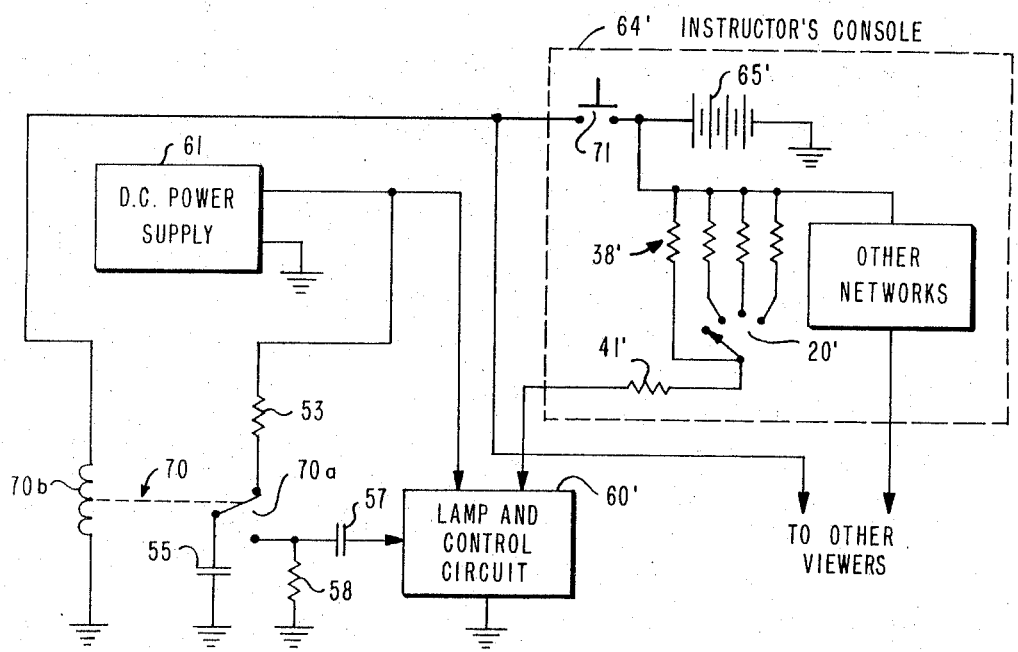
FIG.—3
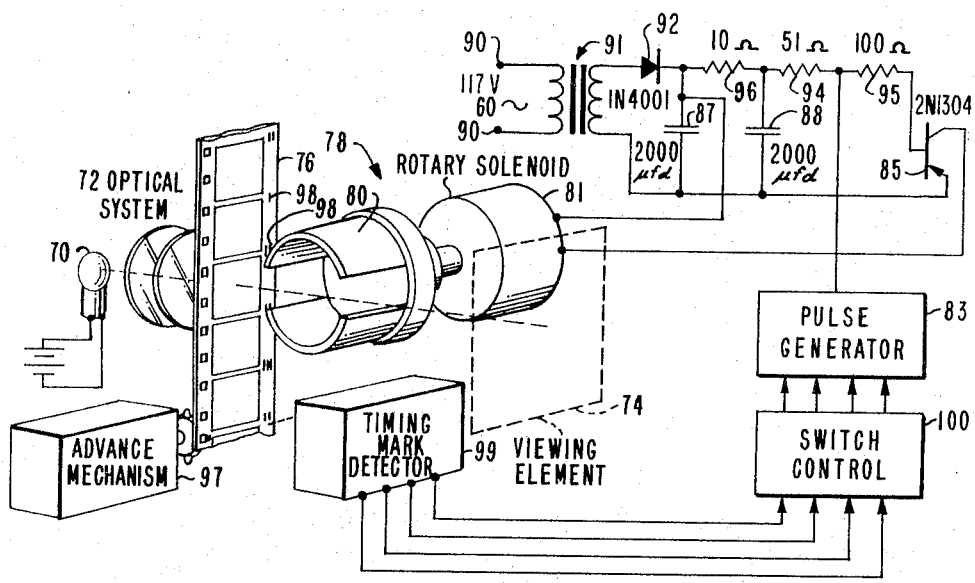
FIG.—4

# 3,341,951
DISPLAY CONTROL FOR TESTING AND
TEACHING DEVICE
Gaspar Cisneros Barnette, 7138 Samoa Place,
Tujunga, Calif. 91042
Filed Oct. 8, 1965, Ser. No. 494,051
20 Claims. (Cl. 35—35)

This invention relates to tachistoscopic teaching devices, and particularly to control circuits for visual display systems.

Tachistoscopic viewer and display devices have come into widespread use for individual and classroom instruction. These devices generally use a projection medium such as a film strip, for presenting successive displays of factual information, test sequences and the like. The display presentations comprise controlled sequences that greatly facilitate comprehension and retention of information. In accordance with tachistoscopic techniques, the display is flashed momentarily and not held for an extended interval.

Expanding use of devices of this nature has led to the employment of a variety of mechanisms, including film strip projectors for numbers of students, and film strip viewers for individual students. When used in either manner, the tachistoscopic feature provides a significant contribution to the teaching and testing function. A given frame is exposed for a predetermined brief interval, of the order of one-fifth to one-fortieth of a second. To this end, it is necessary to generate an energizing impulse of a precise duration for the light source. In using the viewer or display device, the student instinctively becomes attentive to the flashed display, so that concentration is automatically enhanced. The longer times, such as one-fifth and one-tenth second, are used primarily with beginning or problem students. The one-twentieth and one-fortieth second intervals are more often employed, depending upon the ability of the student and the nature of the subject matter, because they present a greater but still reasonable demand on the student's attention. Precise control is extremely important to continuance of both attentiveness and learning, and to development of a capability for grasping information content in a single glance.

The practical requirements of tachistoscopic devices must of course be considered in providing a display control of this kind. Inasmuch as such devices are used for individuals, and small groups, and normally purchased from educational budgets, the desired functions must be achieved at minimum expense. A number of circuits are known, for example, which can provide precise timing control and a wide range of adjustment, but these circuits involve an excessive number of active elements and disproportionately increase the price of a viewer. Other circuits are known using time delay relays which also are not fully suitable for this application, partly because of cost and the likelihood of relay failure, but also because of the distractions introduced by relay noise during operation. Many circuits suffer from a severe disadvantage in that they consume excessive amounts of power in energizing the light source within the viewer. The high level of energization not only leads to more likelihood of failure of the illuminator, but also causes excessive and uncomfortable heating of the mechanism. High energization current levels are often thought necessary in order to establish a desired light intensiy for daylight operation without room darkening.

Additionally, most circuits of the types known in the art for the generation of timed pulses of variable duration are not suitable for this application, because they are inherently limited to given AC or DC operation, and require excessive conversion circuitry for operation under low voltage battery conditions. It will be appreciated that it is often desirable to operate tachistoscopic viewers on battery or DC power. In either instance, however, the desired features of long illuminator life and low heating must not be achieved at the sacrifice of illumination intensity adequate for use under daylight conditions. Operation must also be essentially constant, irrespective of AC line voltage.

A control for a tachistoscopic viewer must additionally provide a substantially precise definition of the illumination interval, while avoiding multiple flashing due to contact bounce on switch closure. A substantial distraction is introduced if the illumination interval is not constant, or is excessively short, or if successive illuminations are provided on a single switch actuation by the student. Such variations in large measure defeat the purposes of the device. Like considerations apply to tachistoscopic display device intended for group use.

It is, therefore, an object of the present invention to provide an improved control circuit for a tachistoscopic device.

A further object of the invention is to provide a reliable, adjustable time interval control for a tachistoscopic device, which control is operable with alternating current or direct current power.

A further object of the present invention is to provide a low cost, highly reliable, adjustable illuminator control for a tachistoscopic viewer for individual students. Another object of this invention is to provide improved tachistoscopic control and display systems.

These and other objects of the present invention are achieved by a control circuit including a selectively operable timing circuit operating at low voltage and having charging and discharging characteristics which are so related that the lamp or other illuminator is energized for only a selected duration. Although the duration is variable between limits, it remains constant once selected, and each actuation of a control switch provides only one flash, despite contact bounce or interrupted switch closure.

In a specific example, a DC supply voltage may be derived from a battery or a rectified AC signal. The supply voltage energizes a variable timing and discharge circuit, such as a one-shot multivibrator, that includes a first transistor arranged to be normally nonconducting in the quiescent state. The collector circuit of the first transistor is in series with the lamp, and energizes the lamp during intervals of conduction. The collector circuit of the first transistor is also coupled, by a passive network, to the base of a normally saturated second transistor, the timing circuit being adjustable by a switch providing a selective coupling to various combinations of resistors in a resistor network. When it is desired to energize the lamp, the base of the first transistor is coupled into a circuit which discharges a capacitor in the base circuit, allowing the transistor to conduct, thus energizing the lamp. Energization of the lamp, however, discharges the capacitor in the timing circuit intercoupling the two transistors, and the second transistor is turned off, with the voltage at the passive network slowly returning to its prior level with a time constant determined by the selected value within the resistor network. When the second transistor returns to saturation, the intercoupling to the base of the first transistor establishes simultaneous cutoff of the first transistor, thus extinguishing the lamp. Closure of the switch initiates this cycle, irrespective of irregularities in the switch mechanism, and control of the lamp circuit is effected by simple but independent means, so that operation is reliable and consistent.

Arrangements in accordance with the invention also permit this control circuit to be operated with a degree of central control. For example, the circuit may be coupled to an instructor's station in a manner permitting the instructor to set the individual time setting. As another example, the circuit may be arranged such that the student must proceed at a pace controlled by the instructor.

In a different tachistoscopic display device in accordance with the invention, pulses of variable length are utilized to control an occluder device so as to provide a flash of controlled duration. In this device, the variable length pulse is converted to a corresponding energizing current for an electromechanical motive device controlling the occluder mechanism.

A better understanding of the invention may be had by reference to the following description, taken in conjunction with the accompanying drawings, in which:

FIG. 1 is a schematic and perspective view of a tachistoscopic viewer and control system in accordance with the invention;

FIGS. 2 and 3 are combined schematic and block diagrams of centrally controllable systems in accordance with the invention, which may be used in conjunction with the control system of FIG. 1, and FIG. 4 is a simplified perspective, block and schematic representation of a different tachistoscopic device in accordance with the invention.

Referring now to FIG. 1, a tachistoscopic viewer 10 for use by an individual student includes a film strip guide mechanism disposed within a viewing housing 12 and employs a manual frame advance and adjustment control 14, together with various switches for different modes of operation. The student views a momentary image on the face plate lens 16 at times that may be externally controlled, as described below in conjunction with FIG. 2, or at times established by a push-button switch 18. In this arrangement, a selector switch 20 is also available for movement to any of a number of positions, for controlling the time of exposure of the image. The times here selected are one-fifth, one-tenth, one-twentieth, and one-fortieth second.

The film strip feeding, advance and adjustment mechanisms are not significant to the inventive concept, and accordingly are not described in detail. The control system, however, by which a lamp 22 within the viewing housing 12 may be energized for selectable intervals, and without repetitious flashing, is shown in the remainder of the diagram of FIG. 1. Typically, the viewer 10 is powered as shown from a regulated power supply 25, such as a +6 volt DC source. Alternatively, however, a conventional alternating current voltage source (not shown) of 117 volts and 60 cycles per second may be rectified and stepped down for this purpose. When so used, the voltage source may be coupled across the terminals of the primary of a stepdown transformer, with a diode and a filter capacitor being coupled to the transformer secondary. Whichever power supply is used, the circuit may be completed through an on/off switch 28, the control button for which is located on the panel of the tachistoscopic viewer 10.

The +6 volt line is coupled to the collector circuits of a pair of transistors 33, 34, the emitter electrodes being coupled to the ground terminal. The collector of the first transistor 33 is coupled to the +6 volt line in series with the lamp 22, whereas the collector of the second transistor 34 is coupled to the line through a load resistor 36. Although transistors 33, 34 of the NPN conductivity type are shown (Type 2N1304 being suitable) it is evident that PNP conductivity type transistors may alternatively be used, with appropriate inversion of the signal and source polarities.

In this configuration, the collector of the first transistor 33 is coupled to the base of the second transistor 34 through a passive network comprising a capacitor 37 and a selectively variable resistive network 38. The base of the second transistor 34 is held, in the quiescent state, at a potential level determined by a voltage divider pair of resistors 40, 41 and an associated one of three differently valued resistors 44, 45, 46, or an open contact position 48. One of the three resistors 44 to 46, or the open contact 48 is coupled to the mid-point of the voltage divider by the timing control switch 20. Suitable values of the various resistors are as follows:

Resistor 36 _____ohms__ 560
Resistor 40 _____kilohms__ 4.7
Resistor 41 _____ohms__ 300
Resistor 44 _____kilohms__ 4.7
Resistor 45 _____do___ 1.6
Resistor 46 _____ohms___620

The collector of the second transistor 34 is coupled in a feedback path to the base of the first transistor 33 through a resistor 50, which may in this example have a value of 180 ohms. The base circuit of the first transistor 33 controls energization of the lamp 22 in a single exposure mode for tachistoscopic viewing. A mode selector switch 52 couples the lamp directly in series between the +6 volt source and ground when closed, thus bypassing the first transistor 33 to provide continuous operation for scanning and framing purposes. The push-button switch 18 comprises a single-pole, double-throw switch, the armature of which in a first position is coupled through a relatively large current limiting resistor 53 to the collector circuit of the first transistor 33 and to the mode selector switch 52. In this "off" state (as shown in FIG. 1), a capacitor 55, connected between the pole of switch 18 and ground, is held substantially at the +6 volt level maintained at the collector of the first transistor 33. When the switch 18 is moved to the "on" position, however, the capacitor 55 is coupled in series with an RC network comprising a capacitor 57 coupled directly to the base of the first transistor 33, and a resistor 58 coupled to the ground. Suitable values for the circuit elements coupled to the first transistor 33 are as follows:

Capacitor 37 _____microfarads__ 50
Resistor 53 _____megohm__ 1
Capacitor 55 _____microfarad__ .047
Capacitor 57 _____do____ .047
Resistor 58 _____ohms__ 51

In operation of this control system to provide tachistoscopic operation the mode selector switch 52 is held open. Lamp energization is initiated by movement of the push-button switch 18 coupled to the base circuit of the first transistor 33. Two separate operating states may be identified, one of which may be termed the quiescent state and the other of which may be termed the active or lamp energization state. In the quiescent state, the second transistor 34 is held in its saturation condition by the positive voltage maintained at its base through the resistance network 38. The resistance value coupled into the base circuit of the second transistor 34 is dependent upon the setting of the switch 20, but the setting does not affect the saturation condition of the second transistor 34. In the quiescent state the collector of the second transistor 34 is maintained at substantially ground level, this signal level being applied in turn to the base of the first transistor 33 to prevent current flow through the transistor 33. Thus no current flows through the lamp 22 at this time. Prior to actuation of the switch 18, the collector of the first transistor 33 is at substantially +6 volts, and the discharge capacitor 55 is charged to the same level through the current limiting resistor 53. Upon actuation of the switch 18 to its alternate contact, the discharge capacitor 55 is discharged through the resistor 58, applying a positive-going pulse to the base of the first transistor 33. The base is then drawn well above ground, permitting the first transistor 33 to conduct and turning on the lamp 22 for the interval of time during which the transistor 33 conducts. At this time, the collector of the first transistor 33 is driven toward ground, discharging the capacitor 37 in the interconnecting passive network between the two transistors 33, 34. Discharge of the capacitor 37 drives the base of the second transistor 34 toward ground, thus drawing the second transistor 34 out of saturation. The feedback from the collector of the second transistor 34 holds the base of the first transistor 33 positive, relative to the emitter, tending to keep that transistor in its conducting state.

After initial discharge of the capacitor 37, recharging commences, the recharging interval being defined by the selected value within the resistive network 38 and the value of the capacitor 37. The lower the resistance, the faster the recharging interval, and the more quickly the second transistor 34 is again rendered conducting. Thus, the relatively lowest resistor 46 (compared to resistor 40) is used for the 1/40 second interval, and the open contact position 48 is used for the 1/5 second interval. Conduction in the second transistor 34 effectively grounds the base of the first transistor 33 through the feedback resistor 50, substantially immediately turning off the first transistor 33 and the lamp 22.

It may thus be seen that discharge of the capacitor 55 initiates an action which is independent of contact bounce or other irregularities occurring with closure of the pushbutton switch 18. The discharge circuit is either completed sufficiently to render the first transistor 33 conducting, thus starting the cycle, or has no effect in this regard. Consequently, the timing interval defined by the passive network coupled between the collector of the first transistor 33 and the base of the second transistor 34 is isolated from the initial discharge action, so that the complete time interval and the illuminated state of the lamp are precisely defined. By variation of time constants, of course, the exposure time may be made less than 1/40 seconds or more than 1/5 second.

FIGS. 2 and 3 show embodiments of the invention in which an instructor can exercise considerable control over a plurality of viewers, each of which utilizes a control circuit as described in connection with FIG. 1, rather than leaving the entire control to individual students. The embodiment shown in FIG. 2 includes a lamp control circuit 60, shown in block form, which includes the lamp 22, and the transistors 33, 34, described in connection with FIG. 1, along with the resistor network 38. The DC power supply shown in detail in FIG. 1 is represented in FIG. 2 by a block 61. The embodiment shown in FIG. 2 differs from that previously described in that the two-position switch 18 (FIG. 1) has been replaced by a relay 62 having an actuating coil 62a, and two sets of contacts 62b and 62c. When the coil 62a is deenergized, the contact positions are as shown in FIG. 2, with the contacts 62b being open and the contacts 62c being closed to charge the capacitor 55 through the relatively high resistance 53. The coil 62a of the relay 62 is energized from the power supply 61 through a normally-closed contact 63a of a relay 63 having an actuating coil 63b whose energization is under the control of the instructor. Also in series with the relay coil 62a is a normally open momentary contact push-button switch 64 which is located on the viewer and is under control of the student using the viewer. The contacts 62b are holding contacts for the relay 62.

In the embodiment of FIG. 2, an instructor's console 64 is provided. The console 64 contains a source of DC power, represented by a battery 65, connected through a normally closed push-button switch 66 to the coil 63b of the relay 63. When the instructor momentarily opens the switch 66, it interrupts energizing current through the relay coil 63b to permit the capacitor 55 to start recharging.

The instructor's console 64 also contains a multiple contact selector switch 67, whose contact arm 67a is connected to ground through a voltmeter 68. Each of the contacts in the switch 67 is connected to a different viewer at the juncture point between the resistors 40 and 41 (FIG. 1) in the control circuit. The voltmeter measures the voltage drop across the resistor 41 and the transistor 34 when the circuit is in its quiescent state, and is effective to provide the instructor with information as to the setting of each network 38 that controls the duration of energization of its corresponding lamp 22. The voltmeter may be calibrated in terms of flash durations of the lamp 22, of course.

In operation, when a student momentarily closes the switch 64, the holding contacts 62b close to maintain the coil 62a in an energized state. Simultaneously, the contacts 62c change state to permit the capacitor 55 to discharge through the resistor 58 to trigger the control circuit 60 and energize the lamp 22. The relay 62 will thus remain energized until the instructor interrupts its energizing current by opening the switch 66. This prevents a student from refiring his viewer to obtain a "second look" at the material being displayed. The switch 66 in the instructor's console may be arranged to control all of the viewers in parallel, as shown.

FIG. 3 illustrates another embodiment of the invention in which an instructor can control both the time of flashing and the flash duration of each viewer. As shown, an instructor's console 64' contains a selector switch 20' for each controlled viewer, each viewer being provided with a lamp and control circuit 60' of the type shown in FIG. 1. The circuit 60' differs from that of FIG. 1, however, in that the selector switch for the resistive network (shown in FIG. 3 at 20') and the network itself (shown at 38') are in the instructor's console rather than in the viewer. Also, the switch 18 of FIG. 1 is replaced by a relay 70, having contacts 70a and an actuating coil 70b. In its de-energized state, the relay contacts are as shown to permit charging of the capacitor 55 from the DC power supply 61 through the resistor 53. The relay coil 70b is energized from a DC source, shown as a battery 65' in the instructor's console, through a normally-open momentary contact switch 71 also located in the instructor's console. Similar relay actuating coils in other viewers may also be connected in parallel with the coil 70b.

The instructor's console may contain a network 38' and a selector switch 20' for each student's viewer. Thus, the instructor would set the flash duration for each viewer on the switches 20' and then depress the push-button 71 which would cause all of the viewers to flash simultaneously but for different time durations, if desired. Of course, individual switches 71 could be provided for the different controlled viewers.

It is apparent that the embodiments shown in FIGS. 2 and 3 could be combined to permit an instructor to control the flash duration of each viewer, but allow each student to control the occurrence of the flash. The "lockout" feature, shown in FIG. 2 as comprising the relay contacts 62b, relay 63 and switch 66, might also be provided in such a combination. It is also apparent that the resistor network 38 (FIG. 1) could be replaced by a continuously variable potentiometer.

A different form of tachistoscopic display device in accordance with the invention is illustrated in FIG. 4, and provides mechanical or automatic actuation in a fashion that affords great versatility. The components of the display system, comprising broadly a light source 70, an optical system 72 and a viewing element 74 are shown only in general form, because any of a wide variety of displays may be utilized. These may include film strip, individual frame, microfilm insert, and other types of transparency projectors, as well as overhead and other types of reflective systems. In the optical path between the light source 70 and the viewing element, which may comprise a ground glass screen for a viewer or a reflecting screen for a projection system, are interposed a record member 76 and an occluder device 78 providing the desired successive display information as well as additional data if desired. The optical system 72 and occluder 78 are shown on opposite sides of the record member 76, with the optical system adjacent the light 70, but these elements may be reversed or disposed on the same side of the record member 76. It will be understood that the type of display or projection system is arbitrary, and forms no part of the invention except for its cooperative association with other elements of the system. The occluder device 78 is here illustrated as a barrel type shutter 80 which is successively rotated between open and occluded positions, by energization of a rotary solenoid 81. The rotary solenoid 81 used here by way of example is a commercially available unit sold under the "Ledex" trademark and having an internal energizing coil (not shown) and a fast acting spring return.

The speed of rotation of the solenoid 81 is dependent upon the duration of the applied energizing pulse, assuming no substantial change in waveform, because the fast return action remains substantially constant. Thus the interval in which the shutter 80 is "open" is also determined by the pulse length. A variable duration pulse generator 83 in accordance with the example of FIG. 1 is used in a manner to provide control of the display. A pulse is derived from a DC circuit including a power transistor 85 and a pair of storage capacitors 87, 88 coupled across the energizing coil of the rotary solenoid 81. A 117 volt source of 60 cycle alternating current 90 is coupled through a step-down transformer 91 and a rectifying diode 92 to provide a 7 volt supply providing half-wave rectified current for the circuit. Output pulses from the pulse generator 83 are coupled to the base of the power transistor 85 through the midpoint of a pair of coupled resistors 94, 95, the opposite terminal of these resistors being coupled to a separate resistor 96 coupled between the storage capacitors 87, 88.

The record member 76 is here stepped in conventional fashion, as by a conventional sprocketed film drive advance mechanism 97. Depending on the preparation and nature of the record member 76 a wide variety of transport mechanisms may be used, such as a mechanical detent system, an electrical stepping mechanism controlled by an index indicia on the member itself, or simply manual control by the operator. Index markers may be sensed mechanically, photoelectrically or pneumatically, depending upon the complexity of the system. In the simplest case, index markers, notches or other means may be employed by a teacher, student or other operator to move the record member through successive positions relative to the optical path.

With the pulse generator 83 set to provide a pulse of a given length, the transistor 85 is held normally nonconducting in the absence of an energizing pulse. The capacitors 87, 88 are charged to the maximum amplitude of the half-wave power signal, but the solenoid 81 is not actuated as long as the transistor 85 does not conduct. When the pulse is provided from the pulse generator 83, discharge commences through the solenoid 81 coil as the transistor 85 conducts. The shutter 80 is rotated to its "open" position, which is maintained as long as the coil is energized, and then returns to the "closed" position. Because the duration of the energizing pulse is controlled by the conducting interval of the transistor 85, which in turn depends upon the selected pulse length from the generator 83, the flash duration on the viewing element 84 is positively controlled. The capacitive-resistive circuits further operate as an isolation network, to absorb inductive kickback from the solenoid 81 coil on sudden termination of the energizing pulse.

This arrangement has further advantages, in that it permits substantial extension of the flexibility of the tachistoscopic program. The record member 76 may be prepared to have separate timing marks 98 for each frame. These timing marks 98 are shown as optical variations here, but may comprise magnetic, perforated or other indicia, and may indicate in any chosen code the selected time increment for the individual display with which it is associated. A timing mark detector 99, here an optical device, generates signals representative of the timing code for the display then in position for projection. These signals operate a switch control 100, such as conventional relay circuits (not shown in detail) for selecting the chosen individual resistor (or no resistor) in the network of the pulse generator 83.

By this means the duration of the tachistoscopic flash is selected during preparation of the educational material on the record medium 76. Dependent on the timing marks 98, the detector 99 and switch control 100 automatically vary the flash without the need for manual intervention.

It will be apparent to those skilled in the art that various other modifications are feasible without departing from the true scope and spirit of the invention as defined in the appended claims.

What is claimed is:

1. A control circuit for providing a display of a record member on a viewing element in a tachistoscopic device for a predetermined, variably selectable duration, comprising means in said tachistoscopic device for providing a source of illumination; means in said tachistoscopic device for providing illumination of the viewing element through an optical path for a variable interval in response to a control signal; means disposed in the optical path for providing a record member to be illuminated on the viewing element; and control means including a monostable multivibrator having a pair of active elements, and means for varying the regenerative time constant of said multivibrator, said control means being coupled to provide the control signal to said means for providing illumination.

2. A control circuit for energizing a lamp in a tachistoscopic viewing device for a predetermined, variably-selectable duration, independently of switching irregularities, the control circuit comprising a source of direct current, capacitor means, switching means having first and second contact positions, means connecting said capacitor means to said source of direct current when said switching means is in said first contact position for charging said capacitor means, a one-shot multivibrator having one normally nonconducting transistor and one normally conducting transistor, said lamp being connected in circuit with said normally nonconducting transistor, means for varying the regenerative time constant of said multivibrator, and means connecting said capacitor means to said normally nonconducting transistor to discharge said capacitor means when said switching means is in said second position to make said nonconducting transistor conducting for a predetermined length of time and energize said lamp for said predetermined length of time.

3. The circuit defined by claim 2 wherein said switching means is manually operable, and time for charging said capacitor means is substantially longer than the time for discharging said capacitor means.

4. The circuit defined by claim 2, further including selectively operable means for maintaining said switching means in said second contact position to prevent recharging of said capacitor means.

5. The circuit defined by claim 2, wherein said switching means is a relay.

6. The circuit defined by claim 2, wherein said switching means is a relay having holding contacts, and further including means in circuit with said relay for deenergizing said relay to open said holding contacts.

7. A control system for energizing a lamp in each of a plurality of techistoscopic viewing devices for a predetermined, variably-selectable duration, the system comprising means for supplying direct current to each of said devices, capacitor means in each of said devices, switching means in each of said devices and having first and second contact positions, means connecting said capacitor means to said means for supplying direct current when said switching means is in said first contact position for charging said capacitor means, a one-shot multivibrator in each of said devices and having one normally nonconducting transistor and one normally conducting transistor, said lamp being connected in circuit with said normally nonconducting transistor, means for varying the regenerative time constant of each of said multivibrators, means connecting said capacitor means in each of said devices to said nonconducting transistor in a corresponding multivibrator to discharge said capacitor means when said switching means is in said second position and make said normally nonconducting transistor conducting for a predetermined length of time to energize a corresponding lamp, and means for simultaneously controlling the contact position of said switching means in said plurality of devices.

8. The system defined by claim 7 further including means for monitoring said means for varying said regenerative time constant for each of said multivibrators.

9. The system defined by claim 7, wherein said means for simultaneously controlling the contact position of said switching means in said plurality of devices is contained in an instructor's console, said console also containing said means for varying said regenerative time constant for each of said multivibrators.

10. A control circuit for energizing a lamp in a tachistoscopic viewing device for a predetermined, variably-selective time duration, the circuit comprising a source of low unidirectional voltage, charging and discharging means, switching means having first and second contact positions, means connecting said charging and discharging means through said switching means to said source of voltage when said switching means is in said first contact position for charging said charging and discharging means, means having one normally nonconducting device and one normally conducting device, said lamp being connected in circuit with said normally nonconducting device, means for varying the regenerative time constant of the circuit between said normally nonconducting and conducting devices, whereby when said normally nonconducting device is made conducting, it remains conducting for a length of time determined by said regenerative time constant, and means connecting said charging and discharging means through said switching means to said normally nonconducting device when said switching means is in said second contact position to discharge said charging and discharging means to make said normally nonconducting device conducting for a predetermined length of time and energize said lamp for said predetermined length of time.

11. The circuit defined by claim 10, wherein the time for charging said charging and discharging means is much longer than the time for discharging said charging and discharging means.

12. The circuit defined by claim 10, further including selectively operable means for maintaining said switching means in said second contact position to prevent charging of said charging and discharging means.

13. The circuit defined by claim 10, wherein said switching means is a relay.

14. A control circuit for energizing a lamp in a tachistoscopic viewing device for a predetermined, variably-selectable duration, independently of switching irregularities, the control system including the combination of means providing low voltage direct current power, a pair of transistors, each having a base, collector and emitter, and each being coupled to the direct current power means, a lamp to be energized being connected in the collector circuit of a first of the transistors, the first transistor being normally nonconducting and the second transistor being normally conducting at saturation, passive circuit means coupling the collector of the first transistor to the base of the second transistor, the passive circuit means including a series capacitor and a shunt resistive network, the shunt resistive network including a plurality of selectively variable resistive elements, feedback means coupling the collector of the second transistor to the base of the first transistor, charging circuit means including a capacitor coupled to ground and a resistor coupled to the collector of the first transistor, a switch coupling the capacitor to the resistor in a first position of operation, and coupling the capacitor to the base circuit of the first transistor in a second position of operation, current dissipating resistor means coupled to the base of the first transistor and to the second position of said switch, and means coupled to the lamp and to the collector of the first transistor for providing a selectively closable circuit between said lamp and ground.

15. A control circuit for a tachistoscopic viewer having an energizable lamp which it is desired to energize for selected controlled durations in response to switch actuation, without intermittent actuation and response to faulty switch closure, comprising the combination of means providing a low voltage DC source, means providing a common reference potential, a pair of transistors, each having a base, collector and emitter and each being coupled between the low voltage source and the common reference potential, the lamp being coupled in series with the collector circuit of a first of the transistors, and an adjustably variable passive network coupling the collector of the first transistor to the base of the second transistor, resistive feedback means coupling the collector of the second transistor to the base of the first transistor, the passive network means including first capacitor means and variably selectable resistive means, the second transistor normally being held at saturation, the resistive values of the passive network means being selected relative to the capacitive values to provide charging of the first capacitor means such that the second transistor is returned to conduction between times of the order of one-fifth to one-fortieth second after it has become nonconductive, and discharge circuit means coupled to the base of the first transistor, said discharge circuit means including second capacitor means coupled to the common reference potential and a switch coupled to the opposite terminal of the second capacitor means, the switch having two positions of movement, a first resistor coupling a first position of the switch to the collector of the first transistor, a second resistor coupling the second position of the switch to the common reference potential, the value of the first resistor being at least several orders of magnitude greater than the value of the second resistor, and means coupling the second position of the switch to the base of the first transistor, whereby said capacitor means is discharged rapidly upon movement of the switch to said second position, but charges relatively slowly with respect to the one-fifth to one-fortieth second time of the passive network when said switch is returned to said first position.

16. A tachistoscopic display system for providing illumination of a viewing element for a determinable variably selective duration comprising the combination of means including a source of light arranged along an optical path to the viewing element; means in the optical path providing a record member to be displayed; occluder means, the occluder means including a rotatable barrel shutter coupled to and controlled, by a rotary solenoid, and disposed in the optical path, the rotary solenoid when energized rotating the barrel shutter to an open position and having a fast return action when deenergized; pulse generator means selectively variable to provide pulses of controlled duration; and isolation means responsive to the pulse generator and coupled to the rotary solenoid, said isolation means including storage capacitor means and normally nonconducting amplifier means coupled in series with said rotary solenoid, and means responsive to pulses from said pulse generator for rendering said amplifier conducting for corresponding duration, thereby to energize said rotary solenoid.

17. The invention as set forth in claim 16 above, wherein said isolation means further includes a source of direct current coupled to said capacitor means and said amplifier means, and resistive means coupling said capacitor means to the control element of said amplifier means, and to said pulse generator.

18. A control circuit for energizing an occluder device disposed in the optical path of a tachistoscopic device, to produce a flash of a determinable, variably selectable duration, the control circuit comprising a rotary solenoid mechanism having a duration of operation in a selected position dependent on the duration of energization of an actuating coil thereof, an occluder mechanism disposed in the optical path of the tachistoscopic device and coupled to be controlled by the rotary solenoid mechanism, monostable multivibrator means including means for selectively varying the regenerative time constant thereof, said monostable multivibrator means being responsive to individual actuation signals, and a power pulse generating circuit including capacitor means and amplifier means coupled in series with the solenoid, means for charging said capacitor means, and means coupled to said amplifier means for completing the circuit from the capacitor means through the solenoid means for a duration controlled by said monostable multivibrator.

19. A control circuit for providing tachistoscopic illumination of a viewing element in a tachistoscopic device for a predetermined, variably selectable duration comprising means providing a record member, means providing a source of illumination illuminating the record member on the viewing element, and controllable occluder means disposed between the source of illumination and the viewing element for interrupting the illumination of the viewing element except for predetermined intervals, said occluder means including an energizable element, and further comprising a control circuit for controlling the duration of tachistoscopic illumination of the viewing element including the combination of a source of direct current, capacitor means, means including a monostable multivibrator having one normally nonconducting transistor and one normally conducting transistor, said monostable multivibrator being coupled to said means for controlling the illumination of the viewing element, and means for varying the regenerative time constant of said monostable multivibrator to provide a pulse of selected duration in response to the actuation thereof.

20. A tachistoscopic display device for illuminating a viewing element for selected brief durations comprising the combination of a projector device having a source of illumination, a viewing element, and means for receiving a record member to be displayed, said projector device also including occluder means disposed in the optical path; a record member for display in said projector device including means denoting timing durations for individual display portions thereof; pulse generator means responsive to control signals for providing pulses of selectively variable length; means responsive to the means denoting timing durations on the record member for controlling the pulse generator means to vary the pulse durations therefrom; and means responsive to the pulses from the pulse generator means for operating the occluder means for selected intervals, to open the optical path for said selected intervals.

References Cited

UNITED STATES PATENTS

| | | | |
|---|---|---|---|
| 2,535,243 | 12/1950 | Taylor | 35—35.2 |
| 2,960,627 | 11/1960 | Hunt | 315—240 X |
| 3,126,648 | 3/1964 | Strong et al. | 35—35.2 |
| 3,179,004 | 4/1965 | Stoyanoff et al. | 35—35.2 X |

EUGENE R. CAPOZIO, *Primary Examiner.*

W. GRIEB, *Assistant Examiner.*